(12) United States Patent
Cuomo et al.

(10) Patent No.: US 6,185,614 B1
(45) Date of Patent: Feb. 6, 2001

(54) METHOD AND SYSTEM FOR COLLECTING USER PROFILE INFORMATION OVER THE WORLD-WIDE WEB IN THE PRESENCE OF DYNAMIC CONTENT USING DOCUMENT COMPARATORS

(75) Inventors: Gennaro A. Cuomo, Apex; Binh Q. Nguyen, Cary; Sandeep K. Singhal, Raleigh, all of NC (US)

(73) Assignee: International Business Machines Corp., Armonk, NY (US)

(*) Notice: Under 35 U.S.C. 154(b), the term of this patent shall be extended for 0 days.

(21) Appl. No.: 09/084,452

(22) Filed: May 26, 1998

(51) Int. Cl.$^7$ .................. G06F 15/173; G06F 15/16; G06F 7/00
(52) U.S. Cl. ................... 709/224; 709/203; 707/104
(58) Field of Search .................... 709/203, 224; 707/6, 10, 104, 501, 513, 3, 5

(56) References Cited

U.S. PATENT DOCUMENTS

| | | | |
|---|---|---|---|
| 5,649,186 | * | 7/1997 | Ferguson ................ 707/10 |
| 5,732,218 | | 3/1998 | Bland ................... 709/204 |
| 5,740,430 | * | 4/1998 | Rosenberg et al. ......... 707/200 |
| 5,745,900 | * | 4/1998 | Burrows ................. 707/102 |
| 5,813,007 | * | 9/1998 | Nielsen ................... 707/10 |
| 5,890,164 | * | 3/1999 | Nielsen .................. 707/201 |
| 5,892,917 | | 4/1999 | Myerson ................. 709/204 |
| 5,893,908 | * | 4/1999 | Cullen et al. ............... 707/5 |
| 5,895,470 | * | 4/1999 | Pirolli et al. ............. 707/102 |
| 5,898,836 | * | 4/1999 | Freivald et al. ........... 709/218 |
| 5,909,677 | * | 6/1999 | Broder et al. ............... 707/3 |
| 5,913,208 | * | 6/1999 | Brown et al. ............... 707/3 |
| 5,941,944 | * | 8/1999 | Messerly ................. 709/203 |
| 5,978,842 | * | 11/1999 | Noble et al. ............. 709/218 |
| 5,983,268 | * | 11/1999 | Freivald et al. ........... 709/218 |
| 5,987,480 | * | 11/1999 | Donohue et al. ........... 707/501 |
| 5,999,929 | * | 12/1999 | Goodman ................... 707/7 |
| 6,012,087 | * | 1/2000 | Freivald et al. ........... 709/218 |

FOREIGN PATENT DOCUMENTS 9831155   7/1998  (WO) .

OTHER PUBLICATIONS

Brin, S., et al., "Copy Detection Mechansims for Digital Documents," Proc. Of the 1995 ACM SIGMOD Int'l. Conf. on Management of Data, ACM, pp. 398–409, May, 1995.*

Garcia–Molina, H., et al, "dSCAM: Finding Document Copies Across Multiple Databases," Proc. of the 4th Int'l. Conf.on Parallel and Distributed Information Systems, IEEE, pp. 68–79, May 1995.*

* cited by examiner

*Primary Examiner*—Ahmad F. Matar
*Assistant Examiner*—Andrew Caldwell
(74) *Attorney, Agent, or Firm*—A. Bruce Clay

(57) ABSTRACT

Disclosed is a method and system for collecting profile information about users accessing dynamically generated content from one or more servers. In a specific embodiment, a server dynamically generates a web page in response to a user request. The server customizes the web page content based on the requested universal resource identifier (URI) and one or more of: the user's identity, access permissions, demographic information, and previous behavior at the site. The web server then passes the URI, user identity, and dynamically generated web page to an access information collector. The access information collector generates document comparators from the current web page content and compares them to document comparators associated with previously retrieved web pages. If the current web page is sufficiently similar to some previously retrieved web page, the access information collector logs the URI, user identity, and a document key associated with the matching previously retrieved page. Otherwise, the access information collector generates a new key; stores the new key and the document comparators in a database; and logs the URI, user identity, and the newly generated document key.

27 Claims, 4 Drawing Sheets

METHOD AND SYSTEM FOR COLLECTING USER PROFILE INFORMATION OVER THE WORLD-WIDE WEB IN THE PRESENCE OF DYNAMIC CONTENT USING DOCUMENT COMPARATORS

FIELD OF THE INVENTION

This invention relates in general to computer software, and in particular to a method and system for collecting profile information about users accessing Web pages from a plurality of Web servers. More particularly, the present invention relates to a method and system by which user profile information can be collected when the Web content is generated dynamically for each request at the Web server.

BACKGROUND OF THE INVENTION

In the World-Wide Web, a content provider deploys a plurality of Web servers that deliver Web pages to clients. When requesting a Web page, the client supplies a Uniform Resource Locator (URL) or Universal Resource Identifier (URI) to the server. The server associates this URI with a particular page of content and delivers that information to the requesting client.

As the World-Wide Web is being used increasingly to support commerce and targeted advertising, content providers desire to collect information about which users are accessing the site and what site content those users are accessing. This information can be used to establish "profiles" for each site visitor and enable tuning of the Web site content to meet the visitors' interests. Traditionally, this visitor information is collected by the Web server or a proxy server in the form of a log file. This log file contains, among other things, the requesting host address, the requested URI, and the time at which the request was received. Because each URI represents a particular piece of static content at the Web site, the URI is sufficient for a user profile analyzer to evaluate which content was received by each user and to detect similarities among the behavior of different users.

Recent Web servers are providing support for server-side scripting, whereby the URI is associated with a program or script that is executed at the Web server. This script is responsible for receiving the URI and the user identity and using this information to dynamically generate the content that should be returned to the requesting user. This generated content may account for the user's previous behavior at the site, his access permissions, his demographic information, or any number of other factors. Dynamic server content is supported by most Web servers today, including Microsoft's Active Server Pages, Sun's Dynamic Server Pages, industry-standard servlets, Common Gateway Interface (CGI) executables, and other mechanisms.

As a result of this direction, a particular URI can no longer be associated with particular content at the Web site. On different requests, the URI may return wholly different content depending on the requesting user and the context in which the request was issued. Consequently, existing methods for capturing user information are insufficient for producing meaningful user profiles. More specifically, the reliance on URIs alone prevents the accurate characterization of which users are exhibiting similar access behavior. Therefore, a method is needed for efficiently collecting user access information in the presence of dynamically-generated content at a Web server, in order to support the accurate generation of user profiles.

SUMMARY OF THE INVENTION

One object of the present invention is to provide, within a networked environment, a method of associating each user's request for World-Wide Web information to the content of the retrieved document when that document was generated dynamically.

Another object of the present invention is to group together user requests that retrieve the same document content. Yet another object of the present invention is to ignore minor variations in document content as might occur when the documents differ only in the presence of the requesting user's name. Still yet another object of the present invention is to enable the use of a range of metrics for comparing two documents for similarity.

To achieve the foregoing objects and in accordance with the purpose of the invention as broadly described herein, a method and system are disclosed for collecting information about user accesses by analyzing the content of retrieved documents and associating Document Comparators with each document. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 1:
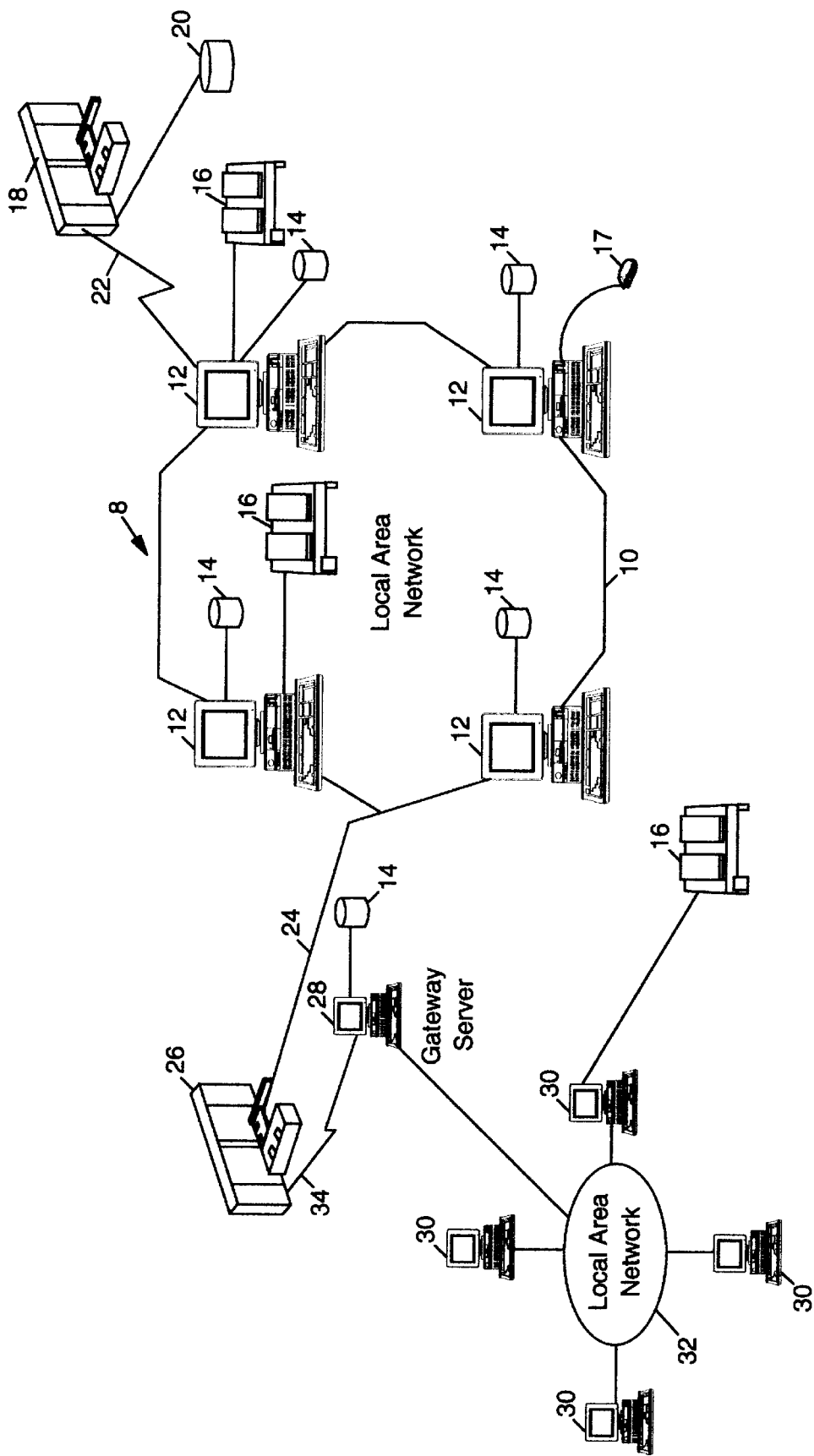
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
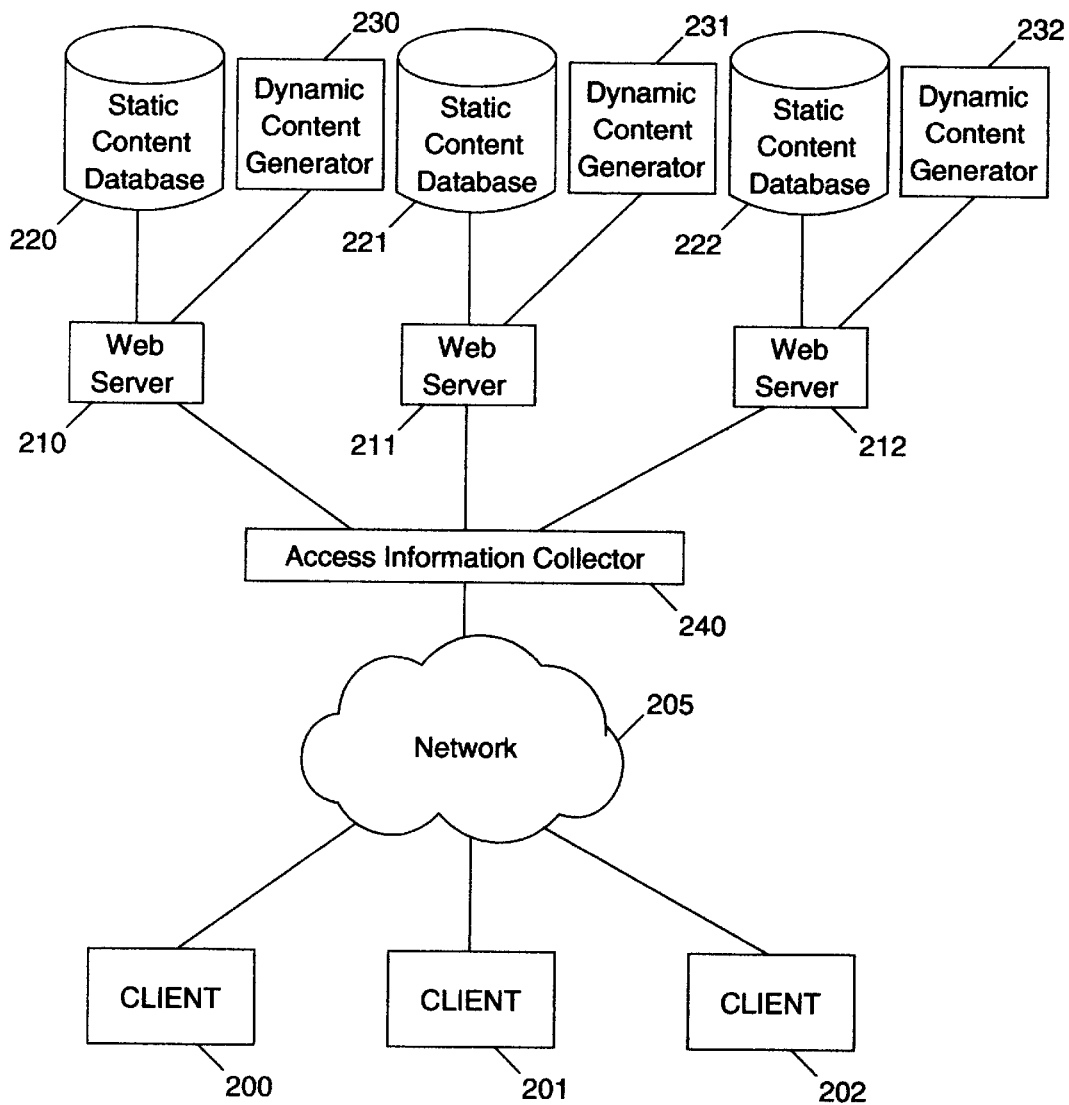
FIG. 2 shows a block diagram of a World-Wide Web environment in which user access information may be generated in accordance with the present invention.

Referring now to FIG. 2, components of a World-Wide Web system are shown in which user information may be gathered in accordance with the present invention. A plurality of clients (generally indicated by reference numerals 200, 201, and 202) access information over a network 205 using World-Wide Web browsers such as NETSCAPE NAVIGATOR, a trademark of Netscape, Inc. or MICROSOFT INTERNET EXPLORER, a trademark of Microsoft, Inc. These clients access a plurality of Web servers (generally indicated by reference numerals 210, 211, and 212) such as LOTUS GO, a trademark of Lotus, Inc., MICROSOFT INTERNET INFORMATION SERVICE (IIS), a trademark of Microsoft, Inc. or NETSCAPE FASTTRACK, a trademark of Netscape, Inc.

In accessing these Web servers, the clients 200, 201 and 202 specify a URI. Each of these Web servers 210, 211, and 212 accesses a Static Content Database (generally indicated by reference numerals 220, 221, and 222) and a Dynamic Content Generator (generally indicated by reference numerals 230, 231, and 232) that receives a URI and other information about the user and generates Web content suitable for display by the browsers at the clients 200, 201, and 202. These Dynamic Content Generators 230, 231, and 232 may take many forms, including Active Server Pages, servlets, Common Gateway Interface (CGI) binaries, or Dynamic Server Pages.

Upon receiving a URI request from a client, the Web server 210, 211, or 212 either retrieves the content from the Static Content Database 220, 221, or 222 or from the Dynamic Content Generator 230, 231, or 232. An Access Information Collector 240 receives client requests and content returned from the Static Content Database 220, 221, or 222 or from the Dynamic Content Generator 230, 231, or 232 and collects log information that can be used to analyze the access patterns of various users. It should be understood that the physical location of the components shown in FIG. 2 may vary. In particular, the Access Information Collector 240 may be embedded in the Web servers 210, 211, and 212. Moreover, the Dynamic Content Generators 200, 201, and 202 and Static Content Databases 220, 221, and 222 may be co-located with the Web servers 210, 211, and 212.

Figure 3:
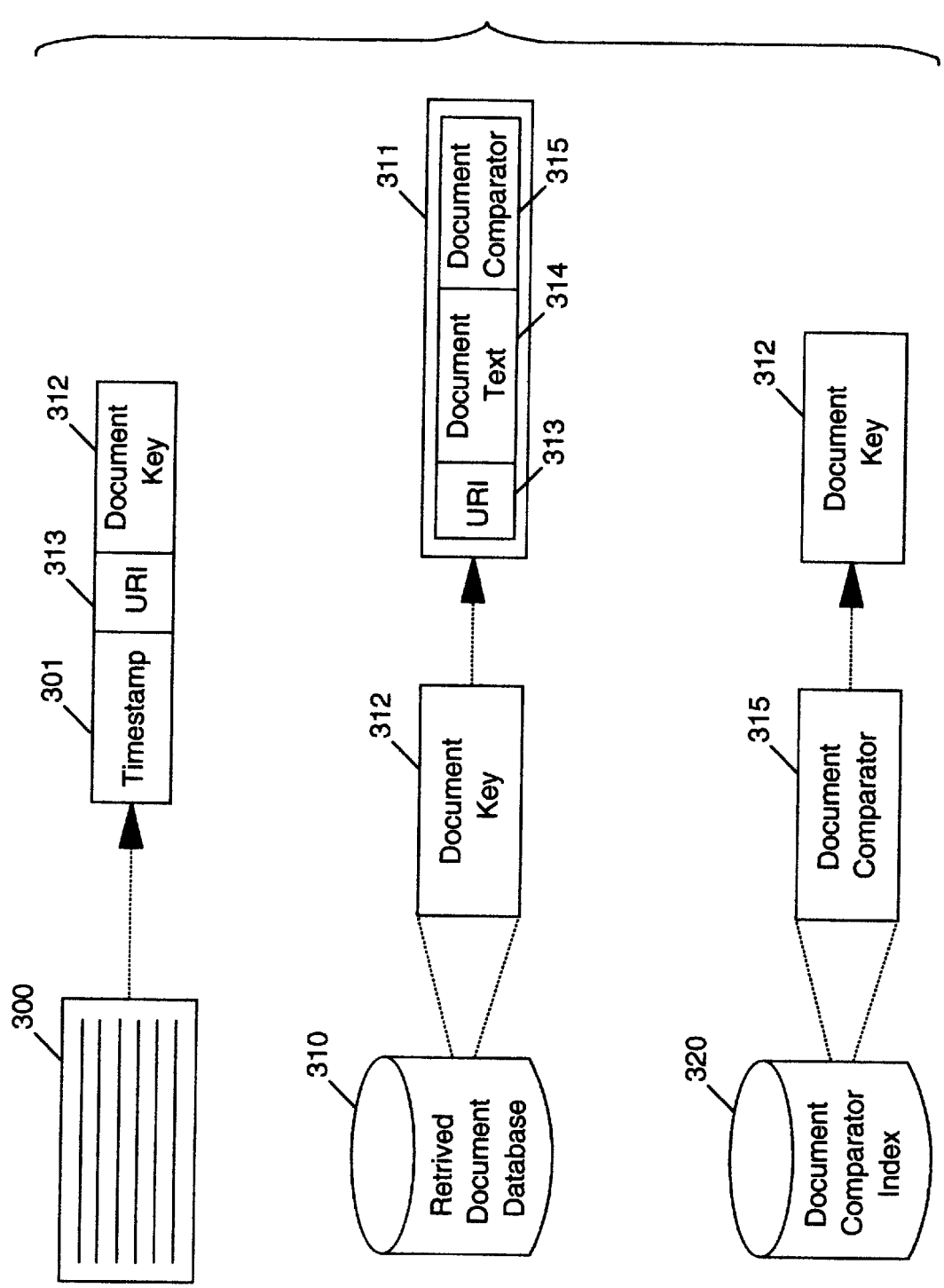
FIG. 3 shows a sample data structure for representing the information collected by the Access Information Collector in accordance with the present invention.

FIG. 3 illustrates the information collected by the Access Information Collector in accordance with the present invention. A Log File 300 contains a sequence of Access Records.

Each Access Record includes at least a time stamp 301, a requested URI 313, and a Document Key 312.

A Retrieved Document Database 310 contains a repository of Document Records corresponding to documents retrieved by users. Each Document Record 311 is indexed by a Document Key 312 and contains an associated URI 313, document text 314, and a Document Comparator 315. The Document Key 312, when combined with the URI 313, serves to uniquely identity the Document Record 311. Document Keys may be assigned sequentially or by any other appropriate method.

The Document Comparator 315 is a representation of the document's contents and is used by a Document Comparator Function to determine whether there are substantial predefined similarities, as will be subsequently described in greater detail, between the current document and other previously retrieved documents. The Document Comparator Function receives the Document Comparators for two documents and determines whether the two documents are substantially similar. To make this determination, the Function may employ a Document Difference Threshold, a numeric value that indicates how much two documents may differ before they are no longer deemed to be substantially similar. The use of the Document Difference Threshold depends on the particular Document Comparator Function being used. The use of a Document Difference Threshold allows the Document Comparator Function to ignore minor differences between two documents. Such minor differences include timestamps, client name, or client-specific data.

In the present embodiment of this invention, the Document Comparator 315 is the actual content of the document itself, and the Document Comparator Function for any two documents is defined to be the number of character insertions, deletions, or modifications required to convert one document to the other. This computation is well understood in the prior art (see, for example, the use of tries, as described in Chapter 11 of Alan Tharp, File Organization and Processing, Wiley, 1988) and will not be discussed further. Alternative embodiments of this invention may compute a Document Comparator 315 by mapping each word, paragraph, or section of the document to a binary token. In this case, the Document Comparator Function might count the number of matching binary tokens, and the Document Difference Threshold would designate what percentage of the tokens must match (see, for example, "Copy Detection Mechanisms for Digital Documents," by Sergey Brin, James Davis, and Hector Garcia-Molina, in Proceedings of the 1995 SIGMOD International Conference on Management of Data, pages 398–409, May 1995). Yet another embodiment of this invention may define a Document Comparator 315 as a list of the most significant (as predefined) words or phrases in the document; the Document Comparator Function may simply count how many words or phrases occur in both documents, and the Document Difference Threshold would designate what percentage of words in each document must appear in the other. Other comparison methods are well established in the prior art. The essential element of a Document Comparator 315 is that a metric (i.e. the Document Comparator Function) must exist for comparing two different Document Comparators to determine by how much their respective documents differ. Indeed, a Document Comparator 315 may actually comprise multiple Comparators, one per each predefined section of the document, each having an associated Document Comparator Function.

Finally, a Document Comparator Index 320 associates each Document Comparator 315 with the corresponding Document Key 312. The Index 320 is used to improve the performance of the Document Comparator 315 evaluations and the selection of Candidate Documents (see FIG. 4). However, it is a performance optimization that may be omitted by alternative embodiments of this invention.

Though the data structures have been illustrated in FIG. 3 with a particular embodiment, alternative representations of this information are possible. The essential attributes of these implementations is the association of each Document Comparator 315 to a Document Key 312, the association of each user URI 313 retrieval with a particular Document Key 312, and the association of each Document Key 312 with particular document content. It should be noted that various optimizations are also possible. For example, instead of storing each document's full content, the Retrieved Document Database 310 may store only a list of most significant words or phrases.

When a document is accessed from the Web server (with a particular URI), the Access Information Collector 240 analyzes the retrieved document (using the Document Comparator Function) to determine whether it is substantially similar to another document that has been previously retrieved from that Web server using the same URI. If a substantially similar document has already been generated by the Web server, then the user's access is associated with that previous document; however, if a substantially similar document has not been previously generated by the Web server, then the user's access is associated with this new document. In this way, the Access Information Collector 240 distinguishes between different dynamically-generated documents retrieved using the same URI while also merging access information about documents that are nearly identical.

Figure 4:
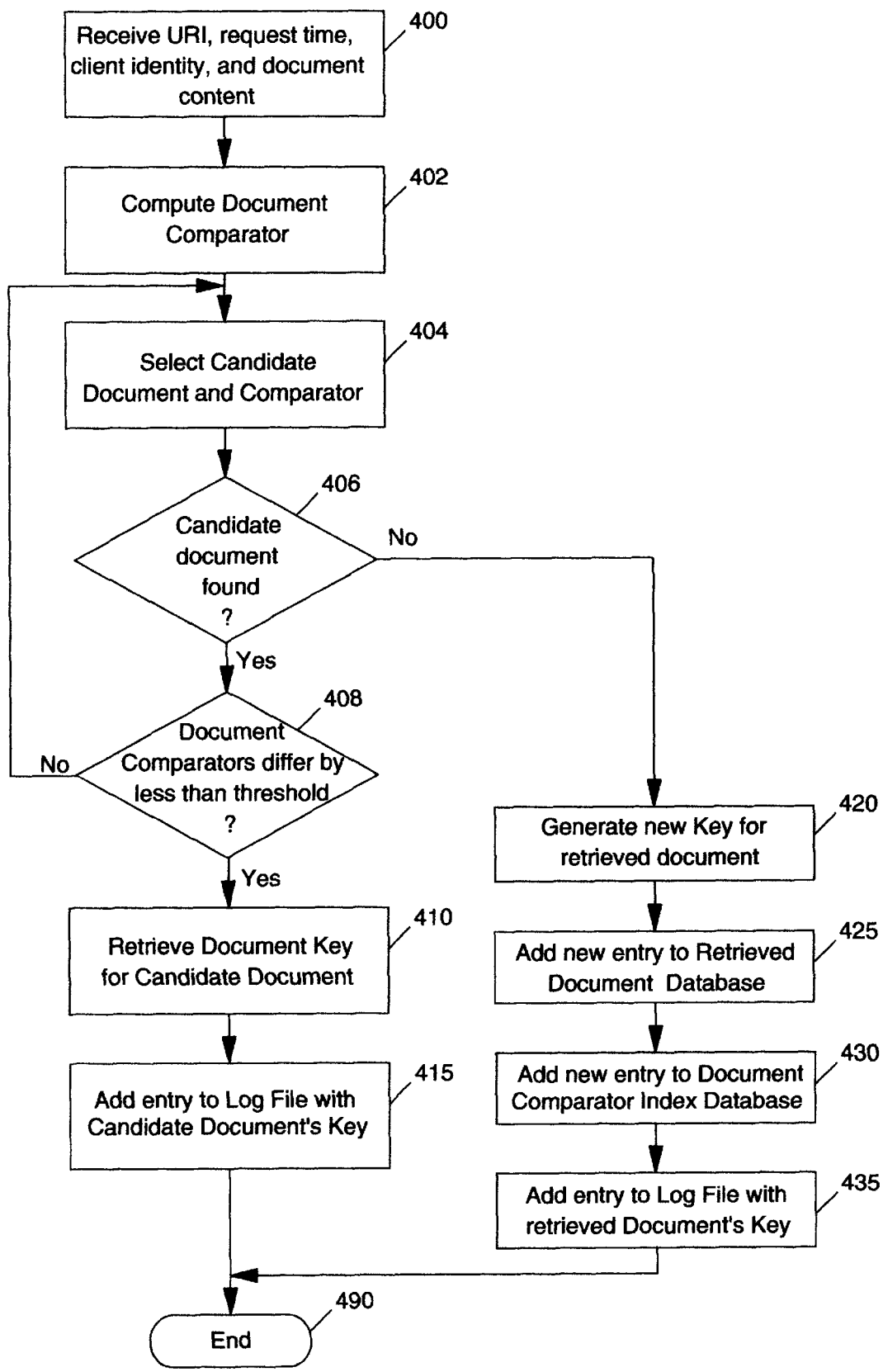
FIG. 4 is a flowchart showing how an Access Information Collector analyzes a document retrieved from a Web server and updates its data structures.

Referring now to FIG. 4, a flowchart depicts the steps taken by the Access Information Collector 240 to analyze a document retrieved from a Web server and to update the Log File 300, Retrieved Document Database 310, and Document Comparator Index 320 (as shown in FIG. 3). At block 400, the Access Information Collector 240 receives the requested URI, the time of the request, the identity of the requesting client, and the content of the retrieved document. At block 402, a Document Comparator 315 is computed for the retrieved document. At block 404, a Candidate Document and Candidate Document Comparator are selected from the Retrieved Document Database 310. The Candidate Document is a document in the Retrieved Document Database 310 whose URI matches that of the retrieved document. (It should be understood that alternative embodiments of this invention may remove the restriction that the URI of the retrieved document and the URI of the Candidate Document match. Alternative embodiments of this invention may also introduce additional restrictions on what constitutes a Candidate Document.) At decision block 406, it is determined whether or not a Candidate Document has been found. If the answer to decision block 406 is yes, then at decision block 408, the Document Comparator Function is invoked with the Document Comparators of the retrieved document and of the Candidate Document to determine whether or not the retrieved document and the Candidate Document are substantially similar.

Continuing with FIG. 4, if the answer to decision block 408 is yes, then it is determined that the retrieved document is sufficiently similar to the Candidate Document and no new entry is required to either the Retrieved Document Database 310 or to the Document Comparator Index 320. At block 410, the Document Key is retrieved for the Candidate Document. At block 415, a new entry is added to the Log File, including the time stamp, requested URI, and candidate document's Document Key. The process then terminates at block 490. If the answer to decision block 408 is no, then control returns to block 404, where another Candidate Document is selected for evaluation.

If the answer to decision block 406 is no, then it is determined that the retrieved document is new. At block 420, a new Document Key is generated for the retrieved document. At block 425, a new entry is added to the Retrieved Document Database 310 to associate the retrieved document's Document Key with a new Document Record containing the retrieved URI, retrieved document, and retrieved document's Document Comparator. At block 430, a new entry is added to the Document Comparator Index 320 database to associate the retrieved document's Document Comparator with the retrieved document's Document Key. At block 435, a new entry is added to the Log File, including the time stamp, requested URI, and retrieved document's Document Key. The process then terminates at block 490.

Thus, each user access is associated with a Document Key representing a document in the Retrieved Document Database with a sufficiently close Document Comparator. Each URI is, therefore, potentially linked with multiple documents, each having different content. At the same time, the analysis ignores minor differences between documents, as might arise when page content is customized in minor ways to reflect the identity of the requesting user.

Although the present invention has been described with respect to a specific preferred embodiment thereof, various changes and modifications may be suggested to one skilled in the art and it is intended that the present invention encompass such changes and modifications as fall within the scope of the appended claims.

What we claim is:

1. A method of collecting information about document retrievals over the World-Wide Web, comprising the steps of:

receiving a requesting user identity, requested Universal Resource Identifier (URI), and a content of a retrieved document;

selecting a Candidate Document from a Retrieved Document Database, said Candidate Document associated with a Candidate Document Key;

comparing said retrieved document to said Candidate Document to determine a sufficiency of said Candidate Document;

associating said retrieved document with a newly generated Retrieved Document Key if said Candidate Document is not deemed to be sufficient;

adding said retrieved document to said Received Document Database; and adding a Log File Entry including said requesting user identity, said requested URI, and said Retrieved Document Key.

2. The method of claim 1, wherein each of a plurality of documents in said Retrieved Document Database is associated with a Document Comparator and wherein a first Document Comparator may be compared to a second Document Comparator using a Document Comparator Function.

3. The method of claim 2, wherein said step of comparing to determine a sufficiency of said Candidate Document further comprises the steps of:

computing said first Document Comparator for said retrieved document;

retrieving said second Document Comparator for said Candidate Document;

computing with said Document Comparator Function a numeric measure of a difference between said first Document Comparator and said second Document Comparator; and comparing said numeric measure against a predefined Document Difference Threshold.

4. The method of claim 2, wherein each said Document Comparator comprises content of said each of a plurality of documents associated therewith.

5. The method of claim 4, wherein a URI for said Candidate Document is equal to a URI for said retrieved document.

6. The method of claim 2, wherein each said Document Comparator is computed by associating predefined portions of said each of a plurality of documents to a binary token.

7. The method of claim 2, wherein each said Document Comparator comprises a list of significant words or phrases in said each of a plurality of documents.

8. The method of claim 2, wherein each said Document Comparator comprises a Comparator for each of a plurality of predefined sections of said each of a plurality of documents.

9. The method of claim 2, wherein said step of selecting a Candidate Document comprises selecting from a Document Comparator Database.

10. A system for collecting information about document retrievals over the World-Wide Web, comprising:

means for receiving a requesting user identity, requested Universal Resource Identifier (URI), and a content of a retrieved document;

means for selecting a Candidate Document from a Retrieved Document Database, said Candidate Document associated with a Candidate Document Key;

means for comparing said retrieved document to said Candidate Document to determine a sufficiency of said Candidate Document;

means for associating said retrieved document with a newly generated Retrieved Document Key if said Candidate Document is not deemed to be sufficient;

means for adding said retrieved document to said Received Document Database; and means for adding a Log File Entry including said requesting user identity, said requested URI, and said Retrieved Document Key.

11. The system of claim 10, wherein each of a plurality of documents in said Retrieved Document Database is associated with a Document Comparator and wherein a first Document Comparator may be compared to a second Document Comparator using a Document Comparator Function.

12. The system of claim 11, wherein said means for comparing to determine a sufficiency of said Candidate Document further comprises:

means for computing said first Document Comparator for said retrieved document;

means for retrieving said second Document Comparator for said Candidate Document;

means for computing with said Document Comparator Function a numeric measure of a difference between said first Document Comparator and said second Document Comparator; and means for comparing said numeric measure against a predefined Document Difference Threshold.

13. The system of claim 11, wherein each said Document Comparator comprises content of said each of a plurality of documents associated therewith.

14. The system of claim 13, wherein a URI for said Candidate Document is equal to a URI for said retrieved document.

15. The system of claim 11, wherein each said Document Comparator is computed by associating predefined portions of said each of a plurality of documents to a binary token.

16. The system of claim 11, wherein each said Document Comparator comprises a list of significant words or phrases in said each of a plurality of documents.

17. The system of claim 11, wherein each said Document Comparator comprises a Comparator for each of a plurality of predefined sections of said each of a plurality of documents.

18. The system of claim 11, wherein said means for selecting a Candidate Document comprises selecting from a Document Comparator Database.

19. A computer program product recorded on computer readable medium for collecting information about document retrievals over the World-Wide Web, comprising:

computer readable means for receiving a requesting user identity, requested Universal Resource Identifier (URI), and a content of a retrieved document;

computer readable means for selecting a Candidate Document from a Retrieved Document Database, said Candidate Document associated with a Candidate Document Key;

computer readable means for comparing said retrieved document to said Candidate Document to determine a sufficiency of said Candidate Document;

computer readable means for associating said retrieved document with a newly generated Retrieved Document Key if said Candidate Document is not deemed to be sufficient;

computer readable means for adding said retrieved document to said Received Document Database; and computer readable means for adding a Log File Entry including said requesting user identity, said requested URI, and said Retrieved Document Key.

20. The program product of claim 19, wherein each of a plurality of documents in said Retrieved Document Database is associated with a Document Comparator and wherein a first Document Comparator may be compared to a second Document Comparator according to a predefined distance metric.

21. The program product of claim 20, wherein said computer readable means for comparing to determine a sufficiency of said Candidate Document further comprises:

computer readable means for computing said first Document Comparator for said retrieved document;

computer readable means for retrieving said second Document Comparator for said Candidate Document;

computer readable means for computing with said Document Comparator Function a numeric measure of a difference between said first Document Comparator and said second Document Comparator; and computer readable means for comparing said numeric measure against a predefined Document Difference Threshold.

22. The program product of claim 20, wherein each said Document Comparator comprises content of said each of a plurality of documents associated therewith.

23. The program product of claim 22, wherein a URI for said Candidate Document is equal to a URI for said retrieved document.

24. The program product of claim 20, wherein each said Document Comparator is computed by associating predefined portions of said each of a plurality of documents to a binary token.

25. The program product of claim 20, wherein each said Document Comparator comprises a list of significant words or phrases in said each of a plurality of documents.

26. The program product of claim 20, wherein each said Document Comparator comprises a Comparator for each of a plurality of predefined sections of said each of a plurality of documents.

27. The program product of claim 20, wherein said computer readable means for selecting a Candidate Document comprises selecting from a Document Comparator Database.

* * * * *